US008760389B2

(12) United States Patent
Yaun

(10) Patent No.: US 8,760,389 B2
(45) Date of Patent: Jun. 24, 2014

(54) HANDWRITING RECOGNITION IN ELECTRONIC DEVICES

(75) Inventor: Shijun Yaun, Beijing (CN)

(73) Assignee: Nokia Corporation, Espoo (FI)

( * ) Notice: Subject to any disclaimer, the term of this patent is extended or adjusted under 35 U.S.C. 154(b) by 1610 days.

(21) Appl. No.: 11/993,770

(22) PCT Filed: Jun. 24, 2005

(86) PCT No.: PCT/IB2005/002312
§ 371 (c)(1),
(2), (4) Date: Jun. 14, 2010

(87) PCT Pub. No.: WO2006/136877
PCT Pub. Date: Dec. 28, 2006

(65) Prior Publication Data
US 2010/0245230 A1    Sep. 30, 2010

(51) Int. Cl.
*G06F 3/00* (2006.01)
*G09G 5/00* (2006.01)

(52) U.S. Cl.
USPC ........ 345/156; 345/173; 345/179; 178/18.01; 382/181

(58) Field of Classification Search
USPC ................ 345/156–184; 178/18.01–20.01; 382/181, 185–189
See application file for complete search history.

(56) References Cited

U.S. PATENT DOCUMENTS

| 5,022,081 A | | 6/1991 | Hirose et al. | |
|---|---|---|---|---|
| 5,049,862 A | * | 9/1991 | Dao et al. | 345/179 |
| 5,699,455 A | * | 12/1997 | Arai et al. | 382/187 |
| 5,781,663 A | * | 7/1998 | Sakaguchi et al. | 382/189 |
| 5,889,888 A | | 3/1999 | Marianetti, II et al. | |
| 6,185,333 B1 | * | 2/2001 | Arai et al. | 382/187 |
| 6,396,950 B1 | * | 5/2002 | Arai et al. | 382/181 |
| 6,697,524 B1 | * | 2/2004 | Arai et al. | 382/187 |
| 6,788,815 B2 | * | 9/2004 | Lui et al. | 382/187 |
| 7,050,046 B1 | * | 5/2006 | Park et al. | 345/173 |
| 7,580,029 B2 | * | 8/2009 | Liu et al. | 345/169 |
| 8,094,938 B2 | * | 1/2012 | Wang et al. | 382/185 |
| 2005/0219226 A1 | * | 10/2005 | Liu et al. | 345/173 |
| 2008/0166049 A1 | * | 7/2008 | Wang et al. | 382/189 |

FOREIGN PATENT DOCUMENTS

| JP | 61175785 | 7/1986 |
|---|---|---|
| JP | 03176786 A | 7/1991 |
| JP | 05012483 | 1/1993 |
| JP | 11282966 A | 10/1999 |

OTHER PUBLICATIONS

Office Action in EP05766243.9 dated Apr. 11, 2012.

(Continued)

*Primary Examiner* — Dmitriy Bolotin
(74) *Attorney, Agent, or Firm* — Banner & Witcoff, Ltd.

(57) ABSTRACT

The present invention provides a method of inputting characters into a handheld device, comprising steps of: reading handwriting information; recognizing said handwriting information in one active recognition mode and at least one inactive recognition mode; displaying at least one character candidate obtained in said active recognition mode and at least one character candidate obtained in said at least one inactive recognition mode; and inputting into said handheld device a desired character candidate selected by a user among said character candidates being displayed. The present invention also provides a corresponding apparatus for inputting characters into a handheld device, and a related handheld device. A user no longer needs to designate handwriting recognition modes, and recognition accuracy is greatly improved.

40 Claims, 3 Drawing Sheets

(56) References Cited

OTHER PUBLICATIONS

Schuermann, editor, Institute of Electrical and Electronics Engineers, "Multifont word recognition system with application to postal address reading." Proceedings of the International Joint Conference on Pattern Recognition. Nov. 8-11, 1976, Coronado, CA, vol. 3, p. 658-662, XP001094630.

"Automatic switching of recognition character set." IBM Technical Disclosure Bulletin, IBM Corporation, New York. vol. 37, No. 4B, Apr. 1, 1994, p. 41. XP000451164, ISSN: 0018-8689.
Office Action dated Aug. 11, 2010 of Application No. 2008-517614.
Office Action dated Dec. 7, 2010 of Application No. 2008-517614.
Official Communication in EP05766243.9 dated Mar. 21, 2013.

* cited by examiner

HANDWRITING RECOGNITION IN ELECTRONIC DEVICES

BACKGROUND OF THE INVENTION

1. Field of the Invention

The present invention relates to the utilization of handwriting recognition (HWR) techniques in electronic devices, and particularly relates to methods of and apparatuses for inputting characters into handheld devices, handheld devices with such apparatuses, and storage media encoded with machine-readable computer program codes for implementing such methods.

2. Description of the Related Art

Nowadays, more and more electronic devices have been developed and used in people's daily lives. These electronic devices, for example, include personal computers (PC), personal digital assistants (PDA), mobile phones, electronic dictionaries, receipt printers, etc. Based on the portability and other considerations, electronic devices may be classified into handheld devices and non-handheld devices. For some electronic devices, and especially for the handheld devices, the ability of receiving and processing text information is important.

In order to input text information or characters into electronic devices, various mechanisms have been invented. Handwriting recognition is a mature technology by which ideographic characters, digits, Latin alphabets, special characters or other text may be recognized from the user's handwriting.

In early days, different kinds of characters, such as ideographic characters, digits, Latin alphabets, and special characters had to be recognized in the same recognition mode. Without considering the peculiarities of different kinds of characters, these early handwriting recognition technologies cannot recognize characters accurately. Since then, technicians have been struggling to improve the accuracy of handwriting recognition technology.

At present, handwriting recognition systems operate in different recognition modes for recognizing different kinds of characters. For example, these recognition modes may include ideographic character mode (such as simplified Chinese character mode, traditional Chinese character mode, Japanese character mode, and so on), digit mode, Latin alphabet mode, special character mode, etc. But in all prior handwriting systems, before a user can write characters on the graphic writing pad, the user has to first designate an active recognition mode. Only in the active recognition mode, can the handwriting recognition system recognize what is being written on the graphic writing pad. In other words, no matter what character the user writes on the graphic writing pad, the handwriting recognition system always recognizes the handwriting as characters particularly corresponding to the active recognition mode. For example, if the active recognition mode is Chinese character mode, the handwriting recognition system recognizes whatever is written on the graphic writing pad as Chinese characters. The handwriting recognition systems operating in different recognition modes for recognizing different kinds of characters are referred to as mode-based handwriting recognition systems hereinafter.

The mode-based handwriting recognition systems have several drawbacks. The requirement of first designating a corresponding recognition mode before actually writing is very different from the natural process of writing on paper. In the case of writing contents which include different kinds of characters, a user usually mainly concentrates too much on the contents and forgets to switch the handwriting recognition modes for different kinds of characters. The need to stop while writing, find a correct recognition mode, switch to it and write previous contents once again greatly hinders the natural process of thinking and writing.

Even worse, sometimes it is not clear to the user which recognition mode is correct for some characters. For example, the inventor has noticed that in the usability test users were sometimes confused about whether punctuation marks such as comma and full stop are available in Chinese character mode or special character mode. Judging the correct recognition mode is also a burden for users using mode-based handwriting recognition systems.

To reduce users' burden of judging and switching the handwriting recognition modes, some handwriting recognition engines may work in a mixed-mode, in which the handwriting recognition engines try to find the best matches to the users' writing in all other modes, so that the users do not have to manually switch the mode. However, the intelligence of such engines is so limited that the accuracy of handwriting recognition is rather low. Also, the candidate list is messy, which makes it difficult for users to select a desired character. This is due to the fact that characters from different modes are mixed together while being displayed, and that some candidate characters for a given writing resemble very much. For example, Chinese character "one" and a dash (a straight horizontal line) are similar. So are English letter "l" and digit "1".

SUMMARY OF THE INVENTION

An object of the present invention is to improve the handwriting recognition solutions utilized in electronic devices, and particularly in handheld devices.

In order to achieve the above object, the present invention provides a method of inputting characters into a handheld device, comprising steps of: reading handwriting information; recognizing said handwriting information in one active recognition mode and at least one inactive recognition mode; displaying at least one character candidate obtained in said active recognition mode and at least one character candidate obtained in said at least one inactive recognition mode; and inputting into said handheld device a desired character candidate selected by a user among said character candidates being displayed.

The present invention also provides an apparatus for inputting characters into a handheld device, comprising: a graphic writing pad, for reading handwriting information; a handwriting recognition engine, for recognizing said handwriting information in one active recognition mode and at least one inactive recognition mode; a display, for displaying at least one character candidate obtained in said active recognition mode and at least one character candidate obtained in said at least one inactive recognition mode; and means for inputting into said handheld device a desired character candidate selected by a user among said character candidates being displayed.

The present invention further provides a handheld device, comprising: a graphic writing pad, for reading handwriting information; a handwriting recognition engine, for recognizing said handwriting information in one active recognition mode and at least one inactive recognition mode; a display, for displaying at least one character candidate obtained in said active recognition mode and at least one character candidate obtained in said at least one inactive recognition mode; and means for inputting a desired character candidate selected by a user among said character candidates being displayed.

The present invention further provides a storage medium encoded with machine-readable computer program code for inputting characters into a handheld device, the storage medium including instructions for causing a processor to implement the method according to the present invention.

According to the present invention, compared with mode-based handwriting recognition systems, a user no longer needs to designate handwriting recognition modes before actually writing. After a character is written, character candidates are prompted to the user. The prompted character candidates include not only the character candidates that are obtained in the active recognition mode but also the character candidates that are obtained in all inactive recognition modes. The user does not need to care for different handwriting recognition modes for different kinds of characters any longer.

According to the present invention, compared with mixed-mode handwriting recognition systems, accuracy of handwriting recognition technology is greatly improved.

The following table shows some advantages of the present invention over mode-based handwriting recognition systems and mixed-mode handwriting recognition systems.

| Performance | The present invention | Mode-based HWR | Mixed-mode HWR |
|---|---|---|---|
| Necessity to select mode | No | Yes | No |
| Difficulty in choosing a mode | | High | |
| Recognition rate | High | High only for active mode | Low |
| Easiness to find desired character | Easy | Easy only for active mode | Difficult |
| Characters displayed for each mode | More for active mode, less for inactive mode | No candidates inactive modes | Not fixed |

Other features and advantages of the present invention will be clearer from the following description of the preferred embodiments, taken in conjunction with the accompanying drawings, which illustrate, by way of example, the principles of the invention.

DETAILED DESCRIPTION OF THE PREFERRED EMBODIMENT

The embodiments of the present invention will be described in detail in the following.

Figure 1:
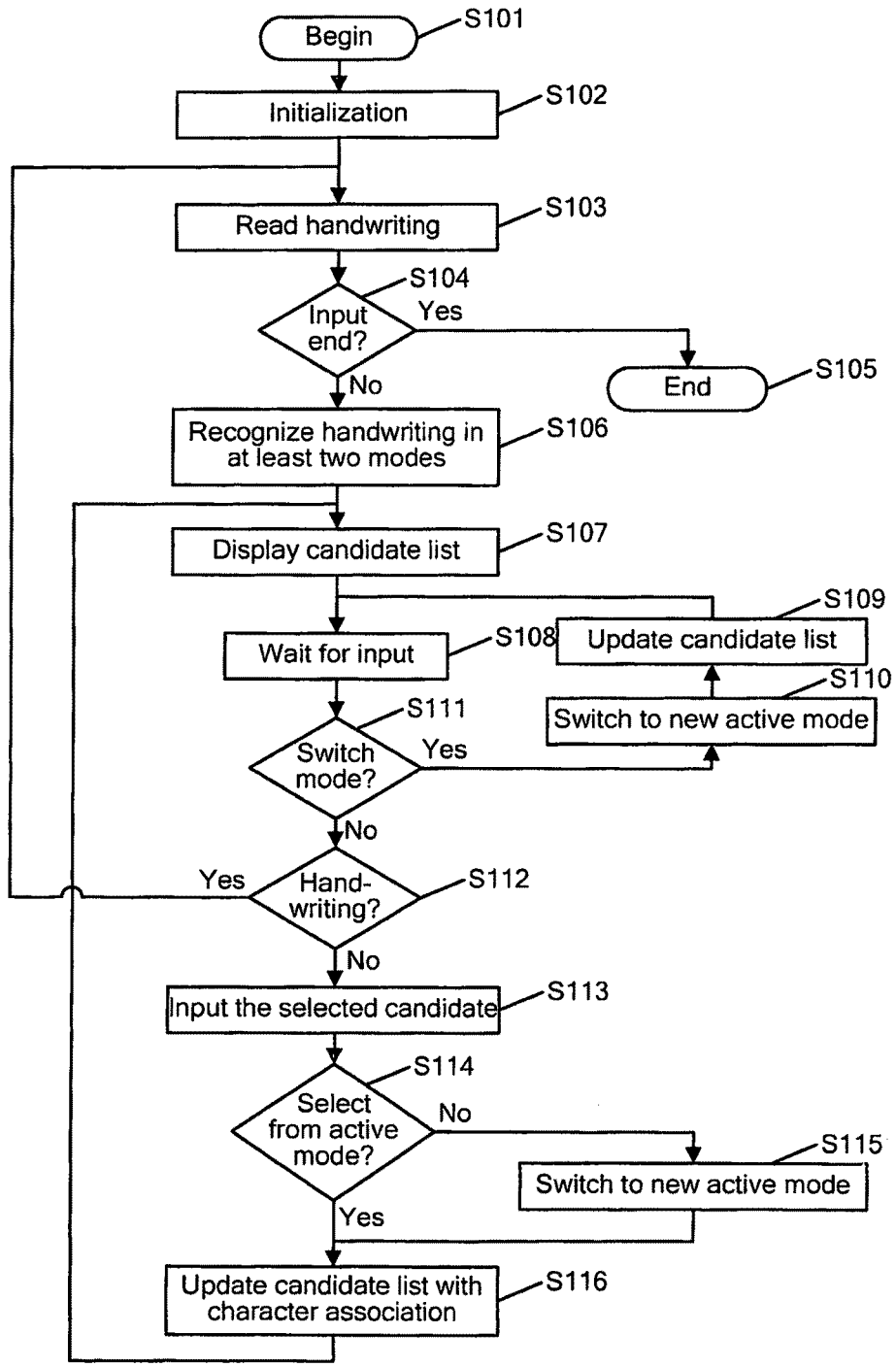
FIG. 1 is a flow chart of the method of inputting characters into a handheld device according to one embodiment of the present invention.

FIG. 1 is a flow chart of the method of inputting characters into a handheld device according to one embodiment of the present invention.

As shown in FIG. 1, the process begins at step S101. Then, at step S102, an initialization is performed. The initialization sets the environment for the handwriting recognition procedure. This includes clearing buffers, setting initial values for variables, etc.

Next, at step S103, handwriting information is read from a user. In one example, the user writes characters on a graphic writing pad as if he or she were writing on paper as usual. Electrical signals induced on the graphic writing pad are translated into handwriting information, and the handwriting information is read into the handwriting recognition system in step S103. As to how to read handwriting information from the graphic writing pad is well known in the art. Any suitable techniques may be utilized in step S103 and constitute no restriction to the present invention.

At step S104, it is decided whether the process of inputting characters into the handheld device is ended. For example, the user may press a physical key or a virtual key to notify the handheld device that the inputting process is finished. Alternatively, the user may write certain characters or symbols on the graphic writing pad to make such a notification. Although FIG. 1 shows that step S104 is after step S103, in practice, step S103 may be located at any position after step S101.

If the result of step S104 is yes, the process goes to step S105; otherwise, the process goes to step S106.

At step S105, the process ends.

At step S106, the handwriting information is recognized in at least two recognition modes. That is, the handwriting information is converted into character candidates in different recognition modes respectively. Here, the different recognition modes include any present or future handwriting recognition modes, including ideographic character mode (such as simplified Chinese character mode, traditional Chinese character mode, Japanese character mode, and so on), digit mode, Latin alphabet mode, special character mode, etc. Among these different handwriting recognition modes, one handwriting recognition mode may be designed as an active recognition mode, while all other handwriting recognition modes are deemed as inactive recognition modes. For example, when Chinese character mode is the active recognition mode, and the user draws a straight horizontal line on the graphic writing pad, in step S106, the handwriting information may be converted in step S106 into Chinese character "one", and a dash.

Next, at step S107, all character candidates obtained in step S106 are displayed. Character candidates obtained in different recognition modes may be displayed separately, for example at different positions, in different colors, styles or sizes, such that the user may easily distinguish character candidates from different recognition modes. Preferably, a plurality of character candidates from the active recognition mode may be displayed and thus occupy a larger display area, and only a few (say one) character candidates from each inactive recognition mode may be displayed and thus occupy a smaller display area. The displaying order may also be such defined that character candidates obtained in the active recognition mode are displayed at the most prominent places, for example, on the left hand side (i.e., in leading positions) of the display window.

Then, at step S108, the process waits for an input from the user. As described below, such an input may be a click on a desired character candidate which is being displayed, or an indication of switching to a new active recognition mode.

At step S111, it is decided whether the input of step S108 is in indication of switching to a new active recognition mode. If the result of step S111 is yes, the process goes to step S110; otherwise, the process goes to step S112.

At step S110, the active recognition mode is switched. That is, in step S110, an inactive recognition mode indicated by the user is set as a new active recognition mode. If so, the original active recognition mode becomes an inactive recognition mode.

Then, at step S109, the displayed character candidates may be updated. For example, the number of the displayed character candidates which are obtained in the original active recognition mode may be decreased, and the number of the displayed character candidates which are obtained in the new active recognition mode may be increased. The displaying order may also be altered such that character candidates obtained in the new active recognition mode are displayed at the most prominent places, for example, on the left hand side (i.e., in leading positions) of the display window.

At step S112, it is decided that whether new handwriting is inputted. If the result of step S112 is yes, the process goes back to step S103; otherwise, the process processes to step S113. The purpose of step S112 is to allow the user to continue to write the same character (if it is not finished), or write another character (if the first character candidate is automatically inputted, and the process waits for a new character, or if all the character candidates are simply disregarded before any selection is made).

At step S113, the character candidate selected by the user is inputted into the handheld device. The user may simply click on the desired character candidate which is displayed in order to select it. If the desired character is not displayed, the user may scroll the display window to see more character candidates.

Then, at step S114, it is decided whether the selected character is one of the character candidates that are obtained from the active recognition mode. If the result of step S114 is yes, the process goes to step S116; otherwise, the process goes to step S115.

At step S115, the active recognition mode is switched. That is, in step S115, the inactive recognition mode in which the selected character is obtained is set as a new active recognition mode, and the original active recognition mode is set as an inactive recognition mode. Then process goes to step S116.

At step S116, the displayed character candidates are updated with word association. Step S116 is similar to step S109. Word association technology may be adopted in step S116. For example, it is possible to prompt character candidates each of which constitutes a phrase with previously inputted character (s). For example, if Chinese character "wo" has been inputted, Chinese character "men" may be prompted, and the candidate list is updated to include Chinese character "men", since previously inputted Chinese character "wo" and currently prompted Chinese character "men" constitute a legal phrase "wo men" which means "we" in English. Word association is optional in step S116 for the case of step S115, since it may be difficult to prompt characters after the active recognition mode has been changed.

After step S116, the process goes back to step S107.

Figure 2:
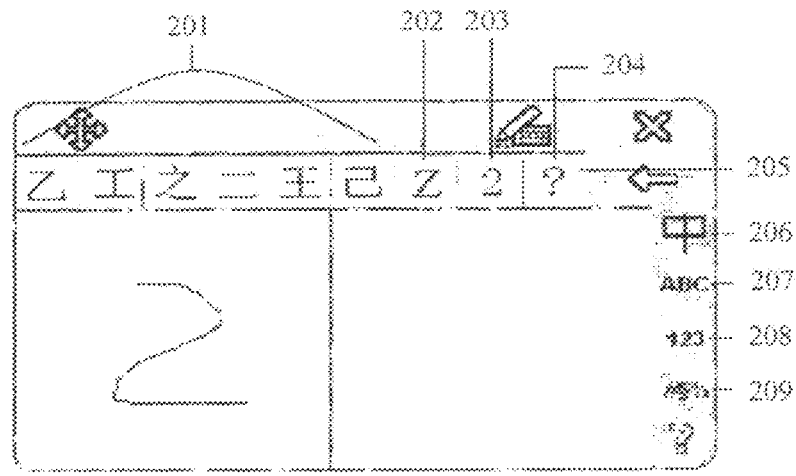
FIGS. 2 and 3 show two screen displays associated with two steps in the exemplified method of FIG. 1.
Figure 3:
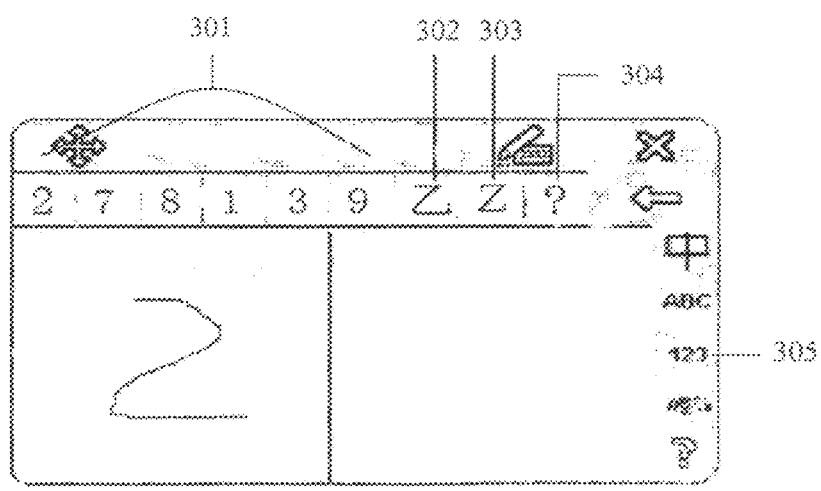

FIGS. 2 and 3 show two screen displays associated with two steps in the exemplified method of FIG. 1.

In FIG. 2, reference numeral 201 represents character candidates (six candidates are shown) obtained in Chinese character mode, 202 the first character candidate obtained in English mode, 203 the first character candidate obtained in digit mode, 204 the first character candidate obtained in special character mode. Reference numeral 205 represent a display window in which character candidates obtained in all recognition modes are displayed. The user may scroll character candidates displayed in display window 205. Reference numerals 206 to 209 represent different buttons for activating different recognition modes, i.e., Chinese character mode button 206, English mode button 207, digit mode button 208, and special character mode button 209. In the state shown in FIG. 2, Chinese character mode is the active recognition mode, thus Chinese character mode button 206 is highlighted.

In FIG. 2, the user may click a desired character candidate in display window 205, or press buttons 207 to 209 to switch the active recognition mode to a corresponding handwriting recognition mode. Character candidates obtained in different recognition modes are displayed in display window 205 in such a consistent manner that it is easier for the user to select the desired character. In so doing, character candidates obtained in the active recognition mode may always be displayed at the left hand side (i.e., in leading positions) of display window 205. In FIG. 2, for example, since Chinese character mode is the active recognition mode, Chinese character candidates 201 are displayed at the left hand side (i.e., in leading positions) of display window 205, and only one character candidate obtained in each of the three inactive recognition modes are display afterwards. In FIG. 3 which will be discussed next, however, since digit mode is set to be the active recognition mode, character candidates 301 obtained in digit mode are displayed at the left hand side (i.e., in leading positions) of display window. Alternatively, the displaying order of the character candidates obtained in the active recognition mode and those obtained in the inactive recognition mode may be the same as that of buttons for activating the recognition modes, such as buttons 206 to 209 in FIG. 2. Additionally, different background colors may be used for displaying character candidates obtained in different recognition modes. This provides a further visual aid to help the user to distinguish the character candidates. However, what is shown in FIG. 2 is only an example of the arrangement of the display window and the graph writing pad and constitutes no restriction to the present invention.

FIG. 3 is an example screen display after digit "2" is selected in FIG. 2.

In FIG. 3, reference numeral 301 represents character candidates obtained in digit mode, 302 the first character candidate obtained in Chinese character mode, 303 the first character candidate obtained in English mode, and 304 the first character candidate obtained in special mode. Reference numeral 305 represents digit mode button. Since digit "2" has been inputted and the active recognition mode has switched to digit mode, digit mode button 305 is highlighted.

Figure 4:
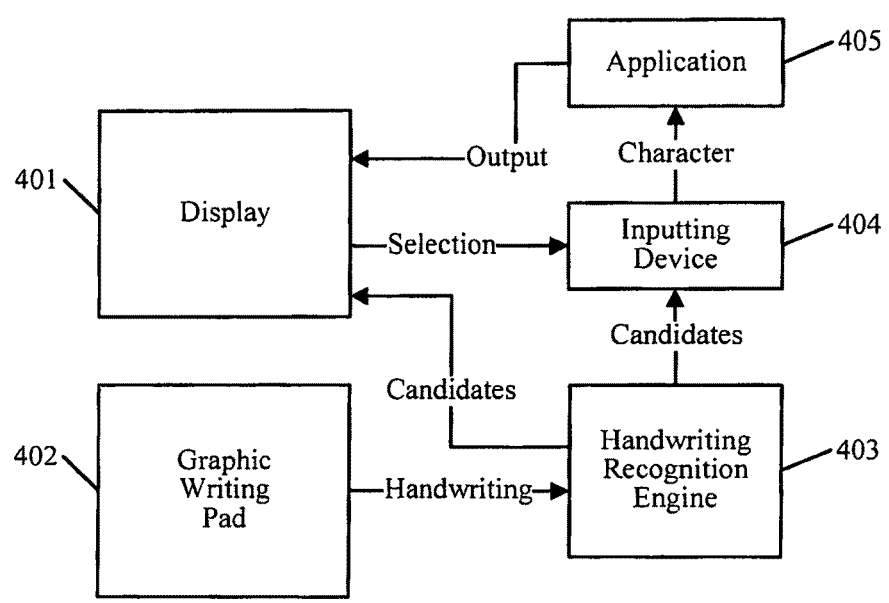
FIG. 4 schematically shows the structure of the handheld device according to another embodiment of the present invention.

FIG. 4 schematically shows the structure of the handheld device according to another embodiment of the present invention. The handheld device shown in FIG. 4 is only an example of the electronic devices to which the present invention applies. In the present invention, electronic devices include personal computers (PC), personal digital assistants (PDA), mobile phones, electronic dictionaries, receipt printers, etc.

In FIG. 4, reference numeral 401 represents a display, 402 a graphic writing pad, 403 a handwriting recognition engine, 404 a an inputting device, 405 an application.

Display 401, graphic writing pad 402, handwriting recognition engine 403 and inputting device 404 are the main components of the apparatus for inputting characters into a handheld device in this embodiment, or the main components of the handheld device in this embodiment.

A handheld device usually includes one or more applications 405 which reside in the internal memory of the handheld device. For example, application 405 may be a notebook, a calendar, an electronic dictionary, etc.

In some cases, display 401 and graphic writing pad 402 may be implemented as a single component.

Graphic writing pad 402 is used for detecting a user's handwriting, converting detected electrical signals into handwriting information, and sending the handwriting information to handwriting recognition engine 403.

Handwriting recognition engine 403 is used for recognizing the handwriting information in one active recognition mode and at least one inactive recognition mode. For detailed explanation about the active or inactive recognition modes, reference may be made to the description of FIGS. 1 to 3.

Display 401 is used for displaying character candidates obtained in the active recognition mode and character candidates obtained in the at least one inactive recognition mode. The character candidates to be displayed are inputted from handwriting recognition engine 403.

Inputting device 404 is used for inputting a character candidate selected by a user among said character candidates being displayed into the handheld device, i.e. finally to application 405 which needs the character.

Display 401 may be implemented as a touch film, but it is not necessarily to do so. If one character candidate displayed on display 402 is clicked on, display 401 sends the selection information to inputting device 404, which in turn, based on the selection information, receives a correspond character candidate from handwriting recognition engine 403. Alternatively, display 401 may directly send the selected character candidate to inputting device 404. The user may also select a desired character by pressing physical keys which are associated with the character candidates.

If the user selects a character candidate which is obtained in an inactive recognition mode, handwriting, recognition engine 403 may switch to this inactive recognition mode, i.e., set this inactive recognition mode as a new active recognition mode.

Of course, if the user initiates a change of recognition mode to an inactive recognition mode, for example, by pressing a physical key or a virtual key, handwriting recognition engine 403 directly switches to this inactive recognition mode, i.e., sets this inactive recognition mode as a new active recognition mode.

After switching to a new active recognition mode, handwriting recognition engine 403 may update the character candidates to be displayed.

All character candidates prompted by handwriting recognition engine 401 in both active recognition mode and inactive recognition modes may be displayed on display 401. If display window of display 401 is not large enough all the character candidates, they can be displayed in different pages. The user may also scroll the display window in order to see more character candidates. Character candidates obtained in different recognition modes may be displayed separately, for example at different positions, in different colors, styles or sizes, such that the user may easily distinguish character candidates from different recognition modes. Preferably, a plurality of character candidates from the active recognition mode may be displayed and thus occupy a larger display area, and only a few (say one) character candidates from each inactive recognition mode may be displayed and thus occupy a smaller display area. The displaying order may also be such defined that character candidates obtained in the active recognition mode are displayed at the most prominent places, for example, on the left hand side (i.e., in leading positions) of the display window.

Handwriting recognition engine 403 may update the prompted character candidates by means of word association after the character candidate selected by the user is inputted by inputting device 404 into the handheld device, say to application 405.

The present invention also provides a storage medium encoded with machine-readable computer program code for inputting characters into a handheld device: The storage medium includes instructions for causing a processor to implement the method according to the present invention. The storage medium may be any tangible media, such as floppy diskettes, CD-ROMs, hard drives, or even network media.

While the foregoing has been with reference to specific embodiments of the invention, it will be appreciated by those skilled in the art that these are illustrations only and that changes in these embodiments can be made without departing from the principles of the invention, the scope of which is defined by the appended claims.

The invention claimed is:

1. A method comprising:
  reading handwriting information;
  recognizing said handwriting information in a first recognition mode and a second recognition mode, wherein one of the first recognition mode and the second recognition mode is designated as active and the other recognition mode is designated as inactive;
  concurrently displaying character candidates on a display, at least one of the character candidates obtained in said first recognition mode and at least one of the character candidates obtained in said second recognition mode, wherein the character candidates are text characters, wherein concurrently displaying comprises:
    displaying a first number of the character candidates obtained in the recognition mode designated as active; and
    displaying a second number of the character candidates obtained in the recognition mode designated as inactive, wherein the first number is greater than the second number; and
  receiving a selection of a character candidate among the character candidates being displayed.

2. The method according to claim 1, further comprising:
  switching a designation of the first recognition mode from active to inactive and a designation of the second recognition mode from inactive to active in response to the selected character candidate being one of the character candidates obtained in said second recognition mode.

3. The method according to claim 2, further comprising:
  updating said displaying of said character candidates in response to said switching.

4. The method according to claim 1, further comprising:
  switching a designation of the first recognition mode from active to inactive and a designation of the second recognition mode from inactive to active in response to the selection of the character candidate;
  displaying in a first manner each of the character candidates for which the recognition mode in which the character candidate is obtained is designated as active after the switching; and
  displaying in a second manner each of the character candidates for which the recognition mode in which the character candidate is obtained is designated as inactive after the switching.

5. The method according to claim 4, wherein:
  the displaying in the first manner includes displaying a first number of the character candidates obtained in the recognition mode designated as active; and
  the displaying in the second manner includes displaying a second number of the character candidates obtained in the recognition mode designated as inactive, wherein the first number is greater than the second number.

6. The method according to claim 4, wherein:
- each of the character candidates displayed in the first manner are displayed in leading positions of a displaying order in the display; and
- each of the character candidates displayed in the second manner are displayed in trailing positions of the displaying order in the display.

7. The method according to claim 4, further comprising updating the displaying of said character candidates in response to said switching.

8. The method according to claim 1, wherein a displaying order of said at least one of the character candidates obtained in said first recognition mode and said at least one of said character candidates obtained in said second recognition mode is the same as that of buttons for activating said first and second recognition modes.

9. The method according to claim 1, wherein said first recognition mode and said second recognition mode are different modes selected from a group consisting of:
- ideographic character modes, digit modes, and Latin alphabet modes.

10. The method according to claim 1, wherein said text characters are selected from a group consisting of one or more of:
- ideographic characters, digits, and Latin alphabet characters.

11. An apparatus comprising:
- a processor; and
- memory having machine-readable computer program code stored thereon, the memory and the computer program code configured to, with the processor, cause the apparatus to:
- read handwriting information;
- recognize said handwriting information in a first recognition mode and a second recognition mode, wherein one of the first recognition mode and the second recognition mode is designated as active and the other recognition mode is designated as inactive;
- concurrently display character candidates, at least one of the character candidates obtained in said first recognition mode and at least one of said character candidates obtained in said second recognition mode, wherein the character candidates are text characters, wherein concurrently displaying comprises:
  - displaying a first number of the character candidates obtained in the recognition mode designated as active; and
  - displaying a second number of the character candidates obtained in the recognition mode designated as inactive, wherein the first number is greater than the second number; and
- receive a selection of a character candidate among the character candidates being displayed.

12. The apparatus according to claim 11, wherein the memory and the computer program code are configured to, with the processor, further cause the apparatus to:
- switch a designation of the first recognition mode from active to inactive and a designation of the second recognition mode from inactive to active in response to the selected character candidate being one of the character candidates obtained in said second recognition mode.

13. The apparatus according to claim 12, wherein the memory and the computer program code are configured to, with the processor, further cause the apparatus to:
- update said displaying of said character candidates in response to said switching.

14. The apparatus according to claim 11, wherein the memory and the computer program code are configured to, with the processor, further cause the apparatus to:
- switch a designation of the first recognition mode from active to inactive and a designation of the second recognition mode from inactive to active in response to the selection of the character candidate;
- display in a first manner each of the character candidates for which the recognition mode in which the character candidate is obtained is designated as active after the switch; and
- display in a second manner each of the character candidates for which the recognition mode in which the character candidate is obtained is designated as inactive after the switch.

15. The apparatus according to claim 14,
- wherein the displaying in the first manner includes displaying a first number of the character candidates obtained in the recognition mode designated as active, and
- wherein the displaying in the second manner includes displaying a second number of the character candidates obtained in the recognition mode designated as inactive, wherein the first number is greater than the second number.

16. The apparatus according to claim 14, wherein:
- each of the character candidates displayed in the first manner are displayed in leading positions of a displaying order in a display window; and
- each of the character candidates displayed in the second manner are displayed in trailing positions of the displaying order in the display window.

17. The apparatus according to claim 14, wherein the memory and the computer program code are configured to, with the processor, further cause the apparatus to:
- update the displaying of said character candidates in response to said switching.

18. The apparatus according to claim 11, wherein a displaying order of said at least one of the character candidates obtained in said first recognition mode and said at least one of the character candidates obtained in said second recognition mode is the same as that of buttons for activating said first and second recognition modes.

19. The apparatus according to claim 11, wherein said first recognition mode and said second recognition mode are different modes selected from a group consisting of:
- ideographic character modes, digit modes, and Latin alphabet modes.

20. The apparatus according to claim 11, wherein said text characters are selected from a group consisting of one or more of:
- ideographic characters, digits, and Latin alphabet characters.

21. An apparatus, comprising:
- means for reading handwriting information;
- means for recognizing said handwriting information in a first recognition mode and a second recognition mode, wherein one of the first recognition mode and the second recognition mode is designated as active and the other recognition mode is designated as inactive;
- means for concurrently displaying character candidates, at least one of the character candidates obtained in said first recognition mode and at least one of said character candidates obtained in said second recognition mode, wherein the character candidates are text characters, wherein means for concurrently displaying comprises:

means for displaying a first number of the character candidates obtained in the recognition mode designated as active; and means for displaying a second number of the character candidates obtained in the recognition mode designated as inactive, wherein the first number is greater than the second number; and means for receiving a selection of a character candidate among the character candidates being displayed.

22. The apparatus according to claim 21, further comprising means for switching a designation of the first recognition mode from active to inactive and a designation of the second recognition mode from inactive to active in response to the selected character candidate being one of the character candidates obtained in said second recognition mode.

23. The apparatus according to claim 22, further comprising:

means for updating said displaying of said character candidates in response to said switching.

24. The apparatus according to claim 21, further comprising:

means for switching a designation of the first recognition mode from active to inactive and a designation of the second recognition mode from inactive to active in response to the selection of the character candidate;

means for displaying in a first manner each of the character candidates for which the recognition mode in which the character candidate is obtained is designated as active after the switching; and means for displaying in a second manner each of the character candidates for which the recognition mode in which the character candidate is obtained is designated as inactive after the switching.

25. The apparatus according to claim 24, wherein the displaying of each of the character candidates in the first manner includes displaying a first number of the character candidates obtained in the recognition mode designated as active, and wherein the displaying of each of the character candidates in the second manner includes displaying a second number of the character candidates obtained in the recognition mode designated as inactive, wherein the first number is greater than the second number.

26. The apparatus according to claim 24, wherein:

each of the character candidates displayed in the first manner are displayed in leading positions of a displaying order in a display window; and each of the character candidates displayed in the second manner are displayed in trailing position of the displaying order in the display window.

27. The apparatus according to claim 24, further comprising means for updating the displaying of said character candidates in response to said switching.

28. The apparatus according to claim 21, wherein a displaying order of said at least one of the character candidates obtained in said first recognition mode and said at least one of the character candidates obtained in said second recognition mode is the same as that of buttons for activating said first and second recognition modes.

29. The apparatus according to claim 21, wherein said first recognition mode and said second recognition mode are different modes selected from a group consisting of:

ideographic character modes, digit modes, and Latin alphabet modes.

30. The apparatus according to claim 21, wherein said text characters are selected from a group consisting of one or more of:

ideographic characters, digits, and Latin alphabet characters.

31. A non-transitory storage medium encoded with machine-readable computer program code, that when executed by a processor, causes an apparatus to:

read handwriting information;

recognize said handwriting information in a first recognition mode and a second inactive recognition mode, wherein one of the first recognition mode and the second recognition mode is designated as active and the other recognition mode is designated as inactive;

concurrently display character candidates, at least one of the character candidates obtained in said first recognition mode and at least one of the character candidates obtained in said second recognition mode, wherein the character candidates are text characters, wherein concurrently displaying comprises:

displaying a first number of the character candidates obtained in the recognition mode designated as active; and displaying a second number of the character candidates obtained in the recognition mode designated as inactive, wherein the first number is greater than the second number; and receive a selection of a character candidate among the character candidates being displayed.

32. The non-transitory storage medium according to claim 31, wherein the machine-readable computer program code, when executed by the processor, further causes the apparatus to:

switch a designation of the first recognition mode from active to inactive and a designation of the second recognition mode from inactive to active in response to the selected character candidate being one of the character candidates obtained in said second recognition mode.

33. The non-transitory storage medium according to claim 32, wherein the machine-readable computer program code, when executed by the processor, further causes the apparatus to:

update said displaying of said character candidates in response to said switching.

34. The non-transitory storage medium according to claim 31, wherein the machine-readable computer program code, when executed by the processor, further causes the apparatus to:

switch a designation of the first recognition mode from active to inactive and a designation of the second recognition mode from inactive to active in response to the selection of the character candidate;

display in a first manner each of the character candidates for which the recognition mode in which the character candidate is obtained is designated as active after the switch; and display in a second manner each of the character candidates for which the recognition mode in which the character candidate is obtained is designated as inactive after the switch.

35. The non-transitory storage medium according to claim 34, wherein the machine-readable computer program code, when executed by the processor, further causes the apparatus to:

update said displaying of said character candidates in response to said switching.

36. The non-transitory storage medium according to claim 34,
  wherein the displaying of each of the character candidates in the first manner includes displaying a first number of the character candidates obtained in the recognition mode designated as active, and
  wherein the displaying of each of the character candidates in the second manner includes displaying a second number of the character candidates obtained in the recognition mode designated as inactive, wherein the first number is greater than the second number.

37. The non-transitory storage medium according to claim 34, wherein:
  each of the character candidates displayed in the first manner are displayed in leading positions of a displaying order in a display window; and
  each of the character candidates displayed in the second manner are displayed in trailing position of the displaying order in the display window.

38. The non-transitory storage medium according to claim 31, wherein a displaying order of said at least one of the character candidates obtained in said first recognition mode and said at least one of the character candidates obtained in the second recognition mode is the same as that of buttons for activating said first and second recognition modes.

39. The non-transitory storage medium according to claim 31, wherein said first recognition mode and said second recognition mode are different modes selected from a group consisting of ideographic character modes, digit modes, and Latin alphabet modes.

40. The non-transitory storage medium according to claim 31, wherein said text characters are selected from a group consisting of one or more of:
  ideographic characters, digits, and Latin alphabet characters.

* * * * *

UNITED STATES PATENT AND TRADEMARK OFFICE
CERTIFICATE OF CORRECTION

| | | |
|---|---|---|
| PATENT NO. | : 8,760,389 B2 | Page 1 of 1 |
| APPLICATION NO. | : 11/993770 | |
| DATED | : June 24, 2014 | |
| INVENTOR(S) | : Shijun Yaun | |

It is certified that error appears in the above-identified patent and that said Letters Patent is hereby corrected as shown below:

In the Claims

In Column 11, Claim 22, Lines 10-11:
Please delete "comprising" and insert -- comprising: --

Signed and Sealed this
Sixth Day of January, 2015

Michelle K. Lee
*Deputy Director of the United States Patent and Trademark Office*